Figure 4:
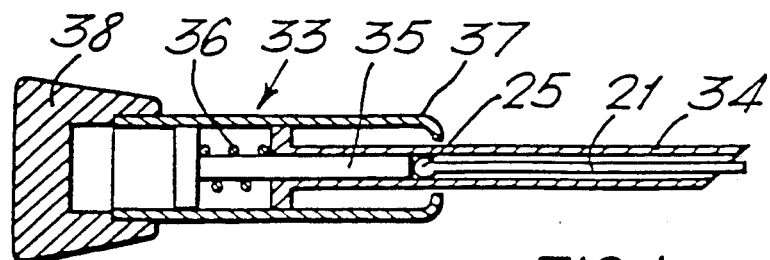

United States Patent [19]

Taylor

[11] Patent Number: 4,679,825
[45] Date of Patent: Jul. 14, 1987

[54] PIPE CONNECTOR

[76] Inventor: Clive N. Taylor, 12 Fern Close, Burton, Christchurch, Dorset, England

[21] Appl. No.: 626,786
[22] PCT Filed: Nov. 1, 1983
[86] PCT No.: PCT/GB83/00280
§ 371 Date: Jul. 16, 1984
§ 102(e) Date: Jul. 16, 1984
[87] PCT Pub. No.: WO84/01990
PCT Pub. Date: May 24, 1984

[30] Foreign Application Priority Data

Nov. 16, 1982 [GB] United Kingdom ............... 8232690

[51] Int. Cl.⁴ .............................................. F16L 35/00
[52] U.S. Cl. ....................................... 285/93; 285/305
[58] Field of Search .............................. 285/305, 321, 93; 403/355; 265/404

[56] References Cited

U.S. PATENT DOCUMENTS

| 268,686 | 12/1882 | Kaiser | 285/404 X |
| 2,013,660 | 9/1935 | Lauer | |
| 2,458,714 | 1/1949 | Mahoney | 285/305 X |
| 2,597,482 | 5/1952 | Harrison | |
| 3,027,631 | 4/1962 | Nathan | |
| 3,527,485 | 9/1970 | Goward | |
| 3,606,402 | 9/1971 | Medney | 285/305 |
| 3,871,691 | 3/1975 | Takagi | 285/321 |

FOREIGN PATENT DOCUMENTS

| 2546123 | 4/1977 | Denmark | |
| 7201654 | 8/1972 | Fed. Rep. of Germany | 285/305 |
| 1219252 | 12/1959 | France | |
| 2192267 | 2/1974 | France | |

Primary Examiner—Dave W. Arola
Attorney, Agent, or Firm—Renner, Otto, Boisselle & Lyon

[57] ABSTRACT

A pipe connector comprising a body having a bore for receiving an end portion of a pipe, said bore having a first groove which co-operates with a groove provided on the pipe, a passageway which extends from the groove to the exterior of the body and through which a retaining rod or wire is pushed so as to be received in the grooves to retain the body on the pipe, said bore also having a groove in which a sealing ring is received, the groove having a side wall which is inclined relative to the axis of the bore and a template for determining the length of the retaining rod or wire.

2 Claims, 8 Drawing Figures

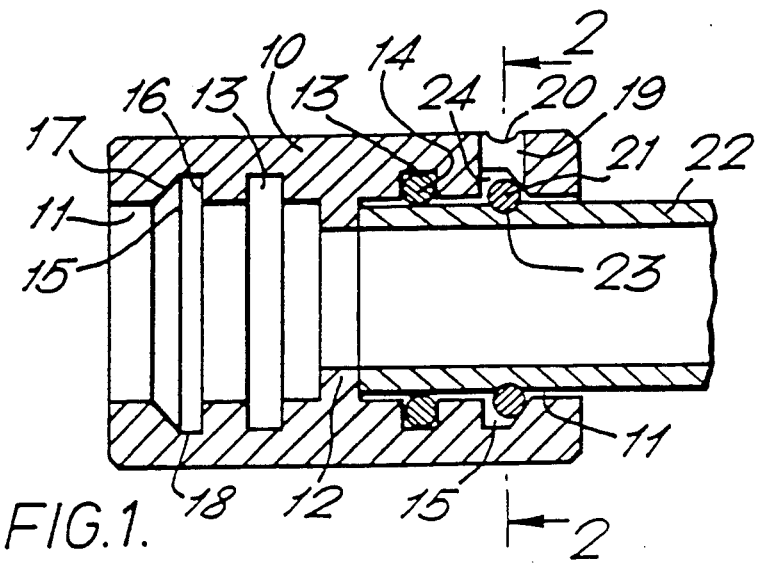
FIG.1.
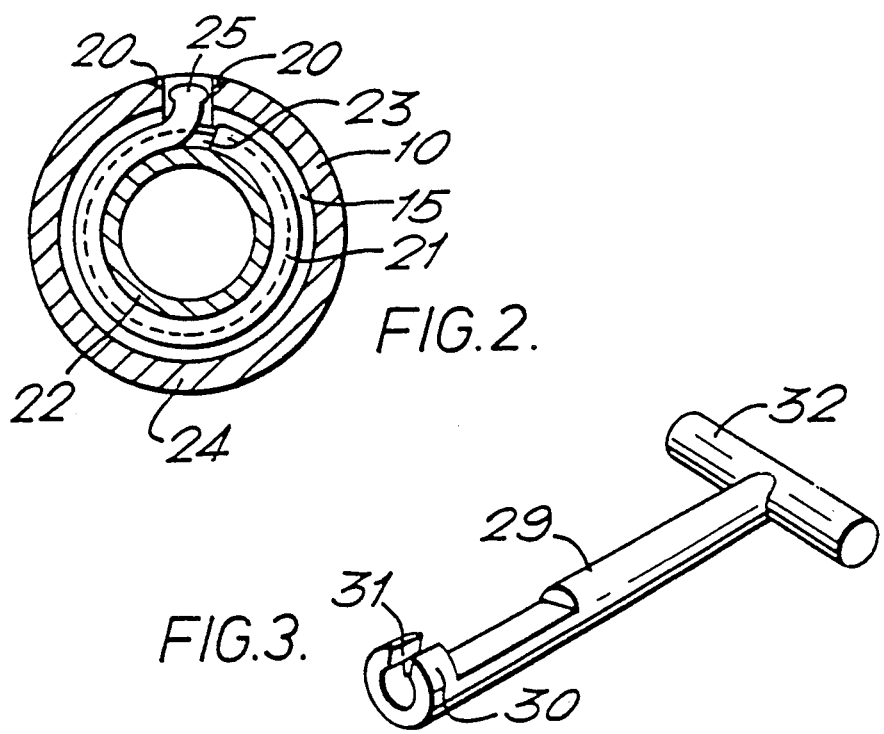
FIG.2.
FIG.3.

PIPE CONNECTOR

This invention relates to a pipe connector which preferably serves to connect a pipe to another pipe or pipes or to a device to be supplied with fluid conveyed through the pipe. However, the term "pipe connector" is also intended to include within its scope a member for blanking-off an end of a pipe.

In the domestic field there are many different forms of pipe connectors which are used with copper pipes. Some of the known connectors rely on the use of solder to form a seal between the pipe and the connector, whilst other known connectors rely on the use of nipples which are clamped between the pipe and the connector. Such connectors are only suitable for use with pipes which contain fluid at relatively low pressure and cannot be used in high pressure systems. There is a need for a pipe connector which has more universal use and can be used both for low pressure and high pressure systems and which is mechanically connected to the pipe.

It is known from GB No. 2014274A, GB No. 1308186 and U.S. Pat. No. 1,464,386 to secure two concentric members together by providing the members with circumferential grooves which co-operate one with the other to form a circular channel in which is inserted a retaining or locking wire.

The present invention provides a pipe connector which utilizes the known locking system having a wire received in co-operating grooves. However, I have found that to apply the known locking system to a pipe connector produces problems due to the fact that copper tubing and pipe connectors are not generally manufactured to fine tolerances. If the outer diameter of the pipe is a slack fit within the bore of the connector then the effective cross-sectional area of the channel formed by co-operating grooves is larger than desired and the locking wire when received therein can expand radially resulting in the mechanical connection between the pipe and the connector being weak as the locking wire will not be seated in the bottom of the groove provided on the pipe. If on the other hand the co-operating grooves are not of exact dimensions they can result in forming a channel whose cross-sectional area is such that the wire has an interferance fit therein and then difficulty is experienced in inserting the wire into the channel and this can result in damage being caused to the wire and/or channel.

According to the present invention there is provided a pipe connector comprising a body having a bore for receiving an end portion of a pipe, said bore being provided with a first circumferentially extending groove arranged to co-operate with a circumferentially extending groove provided on the exterior of said end portion of a pipe, a passageway provided in said body and extending from said first groove to the exterior of said body, a second circumferentially extending groove provided in said bore, a sealing ring disposed in said second groove for sealing engagement with the exterior of a said end portion of a pipe, said first groove when co-operating with a groove on the end portion of a pipe forming therewith a channel in which a retaining rod or wire is inserted by being passed through said passageway, said first groove having a side wall which is inclined to the axis of the bore.

Preferably said side wall is inclined at 25°-35° to the axis of the bore.

The first groove preferably has its other side wall extending at a right angle to the axis of the bore and a base wall which extends parallel to the axis of the bore.

The ends of the passageway are preferably provided with recesses serving as lead-in guides for the retaining rod or wire.

Figure 5:
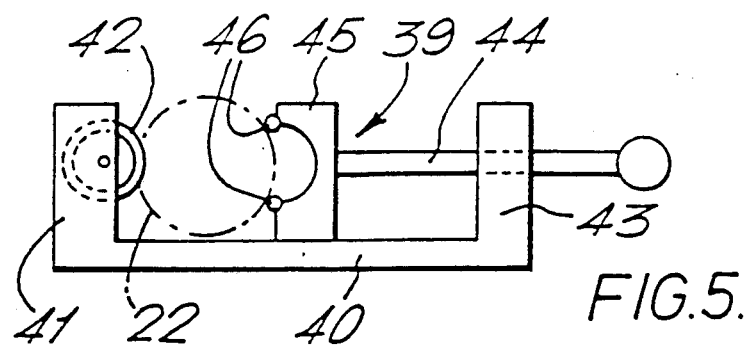
Figure 6:
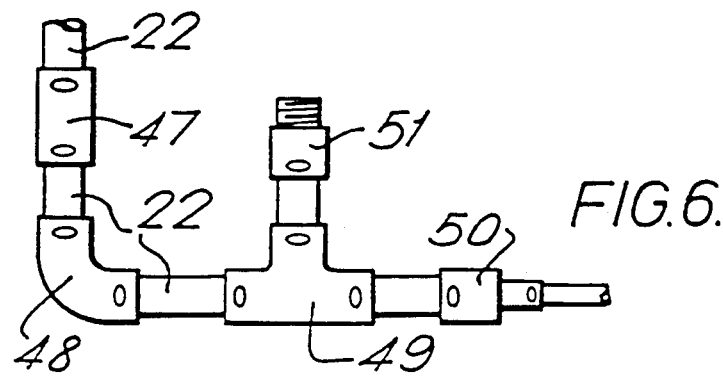
Figure 7:
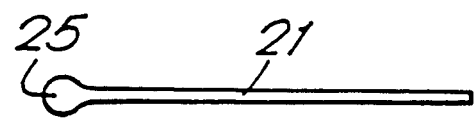
Figure 8:
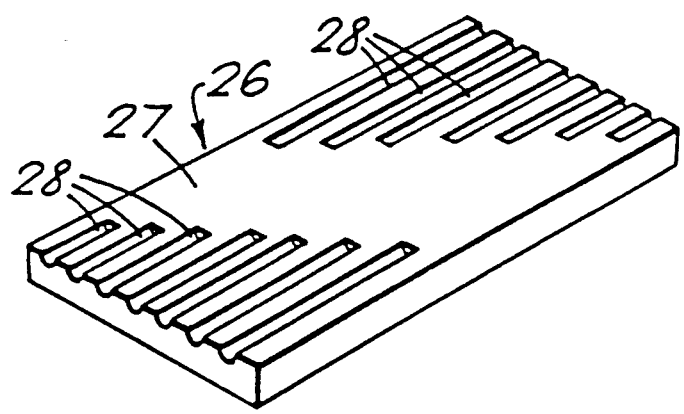

Some embodiments of the invention will now be described, by way of examples, with reference to the accompanying drawings, in which:

FIG. 1 is a longitudinal section through a connector according to the present invention shown connected to one pipe, FIG. 2 is a section taken along the line 2—2 of FIG. 1, FIG. 3 is a perspective view of a tool for use in removing the locking wire or rod, FIG. 4 is a longitudinal section of a tool for inserting a locking wire or rod, FIG. 5 is a side elevation of a tool for producing a groove in a pipe, FIG. 6 is a side view of a pipe assembly showing different forms of connectors, FIG. 7 is a side elevation of a locking wire or pin prior to use, and FIG. 8 is a perspective view of a template for checking the length of a locking wire or pin in relation to the diameter of pipe.

The connector shown in FIGS. 1 and 2 is a straight connector for connecting two pipes in end to end relationship and comprises a body 10 formed of suitable material, such as brass or stainless steel. The body 10 is provided with two axially aligned bores 11 which terminate at and are interconnected through a radially inwardly directed flange 12. Each bore 11 is provided with a peripherally extending groove 13 in which is received a sealing ring 14 formed of rubber or other suitable resilient material. Each bore 11 is also provided with a peripherally extending groove 15 having a side wall 16 which extends at a right angle to the axis of the bore 11 and a side wall 17 which is inclined to the axis of the bore 11. The angle of inclination of the wall 17 is preferable between 25° and 35°. The base 18 of the groove 15 is flat and lies parallel to the axis of the bore 11. The body 10 is provided with a passageway 19 which extends between the groove 15 and the outer surface of the body 10. As shown in FIG. 2 the ends of the passageway 19 are provided at diametrically opposed locations with recesses 20 which define lead-in guides for a locking wire or rod 21. Each bore 11 receives an end portion of a pipe 22 which may be formed of copper. The end portion of the pipe 22 is provided on its outer surface with a circumferentially extending groove 23 which when the end of the pipe 22 abuts the flange 12 is aligned with the groove 15 and defines therewith a channel 24 into which is inserted the locking wire or rod 21 which is partly received in the groove 15 and partly in the groove 23. The locking wire or rod 21 initially comprises a straight rod having at one end a head portion 25 as shown in FIG. 7 and the length of the rod 21 is such that when inserted into the channel 24 the head portion 25 remains in the passageway 19 and the remainder extends substantially completely around the channel 24. The head portion 25 is preferably greater in size than the cross-section of the channel 24 to ensure that the head portion 25 cannot pass into the channel 24. There is therefore a relationship between the length of the locking wire of rod 21 and the diameter of the pipe 22. In order to ensure that a locking wire or rod 21 of the correct length if used the user can be provided with a template 26 as shown in FIG. 8. The template 26 comprises a rectangular plate 27 having at least on one side face a plurality of grooves 28, the length of each groove 28 corresponding to the length of a locking wire or rod 21 required for use with a pipe of a particular diameter which is indicated on the face of the plate 27 at the end of each groove 28. Thus the template 26 can be used to check the length of a locking wire or rod 21 by inserting the wire or rod 21 into the groove 28 corresponding with the diameter of pipe being connected.

By having the cross-section of the groove 15 shaped as shown in the drawing the cross-sectional area of the resulting channel 24 is greater than that of the wire or rod 21 apart from its head portion 25 which results in the wire or rod 21 being easily insertable into the channel 24 without causing damage to the wire or rod 21 and/or the channel 24. By having the wall 17 inclined the wire or rod 21 is forced towards the groove 23 so as to seat in the groove 23 and any tendency for the pipe 22 to move out of the connector results in the wire or rod 21 being held in the groove 23. Therefore even if the connector and the pipe are not manufactured to fine tolerances the wire or rod 21 is urged into seating contact with the bottom of the groove 23 and the mechanical connection between the connector and the pipe 22 is not impaired.

The pipe 22 can be removed from the connector by removing the wire or rod 21 by means of a removal tool 29 as shown in FIG. 3. The tool 29 has at one end a circular portion 30 having a slot 31 therein. The portion 30 can be placed around the portion of the wire or rod 21 in the passageway 19 and engaged under the head portion 25 and then by using a handle 32 the tool 29 can be used to pull the wire or rod 21 out through the passageway 19.

The wire or rod 21 can be inserted by means of an inserting tool 33 as shown in FIG. 4 which comprises a tube 34 in which is received a plunger 35 loaded by a spring 36, the plunger 35 and head end of the tube 34 being received in a tube 37 connected to a handle 38. In use the wire or rod 21 is placed in the tube 34 with the head portion 25 against the plunger 35. The outer end of the tube 34 is placed into the passageway 19 and the handle 38 depressed to cause the plunger 35 to move downwardly against the force of the spring 36, thus pushing the wire or rod 21 into the channel 24.

The groove 23 in the pipe 22 is formed by a grooving tool 39 as shown in FIG. 5 which consists of a bar member 40 having at one end an upstanding wall portion 41 in which is mounted a circular rotatable grooving tool 42 and at its other end with an upstanding wall portion 43 through which extends a screw-threaded rod 44 connected to a slide member 45 provided with backing rollers 46. The pipe 22 to be grooved is placed between the grooving tool 42 and the rollers 46 and the tool 39 is rotated about the pipe 22 whilst at the same time the slide member 45 is adjusted towards the pipe 22.

The connector can take many different forms as shown in FIG. 6, such as a straight connector 47, an elbow connector 48, a branch connector 49, a reducer 50 or a threaded coupling 51. A blanking member (not shown) may be provided to close off an end of a pipe, the blanking member being connected to the pipe in the manner described above.

I claim:

1. A pipe connector comprising a body having a bore for receiving an end portion of a pipe, said bore being provided with a first circumferentially extending groove arranged to co-operate with a circumferentially extending groove provided on the exterior of said end portion of the pipe, a passageway provided in said body and extending from said first groove to the exterior of said body, a second circumferentially extending groove provided in said bore, a sealing ring disposed in said second groove for sealing engagement therewith and with the exterior of said end portion of the pipe, said first groove when co-operating with the groove on said end portion of the pipe forming therewith a channel in which a retaining rod or wire is inserted by being passed through said passageway, and said first groove having side wall means which is inclined relative to the axis of the bore to hold the rod or wire in the co-operating groove thereby to provide an axial interference preventing withdrawal of said end portion of the pipe from the connector; in combination with a template for determining the length of the retaining rod or wire, said template comprising a plate having a plurality of grooves, the length of each groove corresponding to the length of a retaining wire or rod required for use with a pipe of a particular diameter.

2. A combination as set forth in claim 1, wherein said side wall means is inclined at 25° to 35° to the axis of the bore.

* * * * *